Aug. 16, 1949.   L. P. BECKER   2,479,460
LAWN EDGE TRIMMER
Filed April 14, 1947
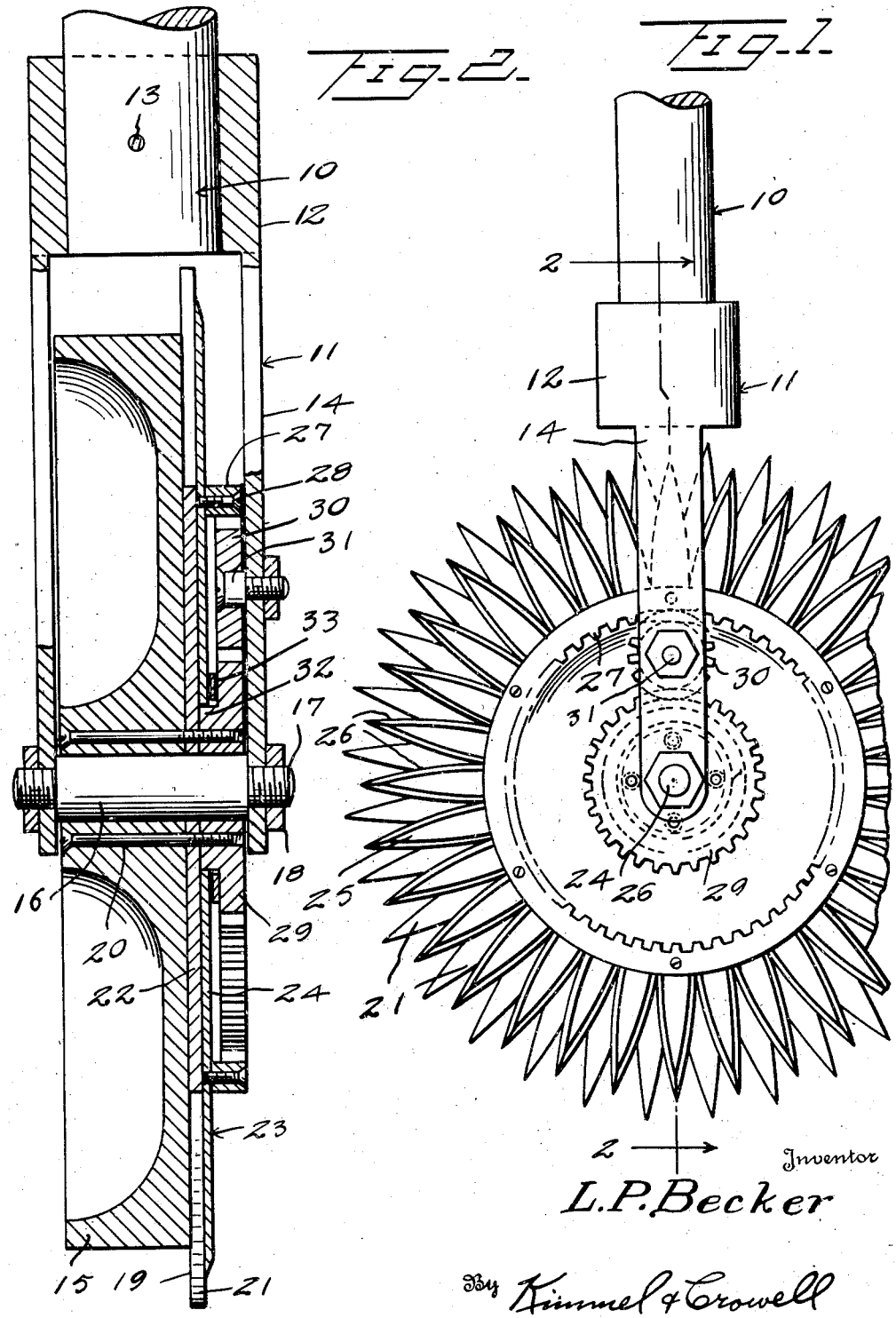
Inventor
L. P. Becker
By Kimmel & Crowell
Attorneys

UNITED STATES PATENT OFFICE 2,479,460

LAWN EDGE TRIMMER

Louis P. Becker, Altoona, Pa.

Application April 14, 1947, Serial No. 741,404

1 Claim. (Cl. 56—256)

This invention relates to lawn edge trimmers.

An object of this invention is to provide a trimmer for the edge of a lawn about a walk or the like, which is adapted to be pushed along the walk and which will cut any overhanging grass.

Another object of this invention is to provide a lawn edge trimmer which includes a traction wheel adapted to roll over the edge of the walk, having a cutter fixed thereto, and a second cutter rotatable reversely from the first cutter.

A further object of this invention is to provide an edge trimmer of this kind wherein the cutters are formed of tapered blades so that the grass will not be pushed outwardly but will be cleanly cut by the blades.

With the above and other objects in view, my invention consists in the arrangement, combination and details of construction disclosed in the drawings and specification, and then more particularly pointed out in the appended claim.

In the drawing,

Figure 1 is a detail side elevation, partly broken away, of a lawn edge trimmer constructed according to an embodiment of this invention, Figure 2 is an enlarged fragmentary sectional view taken on the line 2—2 of Figure 1.

Referring to the drawing, the numeral 10 designates generally an elongated handle which has secured to the lower end thereof a fork 11, which includes a bushing 12 secured by fastening means 13 to the handle 10, and also includes a pair of elongated arms 14.

A traction wheel 15 is rotatably mounted on a shaft 16 which is fixed between the lower ends of the arms 14. The shaft 16 is provided with reduced studs 17 at the opposite ends thereof, which are exteriorly threaded and upon which lock nuts 18 are secured. An inner cutter generally designated as 19 is fixed by means of bolts 20 to the traction wheel 15. The inner cutter 19 includes a plurality of outwardly tapered radially disposed blades 21 formed integral with a central plate 22.

An outer cutter 23 is disposed in face abutting relation to the inner cutter 19, and includes a central plate 24 having extending therefrom a plurality of radially disposed blades 25 which are formed with curved opposite keen edges 26.

In order to provide for rotation of the outer cutter 23 in the direction opposite or reversely from the inner cutter 19, I have provided a ring gear 27 which is fixed by fastening members 28 to the outer side of the outer cutter 23. A sun gear 29 is fixed relative to the inner cutter 19, being secured relative to the cutter 19 and to the traction wheel 15 by the common securing bolts 20. An intermediate gear 30 is rotatably carried by a stub shaft 31 fixed to one of the fork arms 14. The intermediate gear 30 meshes with the ring gear 27 and the sun gear 29 and thereby provides for reverse rotation of the outer cutter 23 with respect to the inner cutter 19.

The sun gear 29 is formed with an inwardly offset boss 32 which forms a bearing for the outer cutter 23. A spring washer 33 is interposed between the sun gear 29 and the outer cutter 23 and provides for holding the outer cutter 23 under tension in face abutting relation to the inner cutter 19.

In the use and operation of this device the traction wheel 15 is engaged with the walk at one edge thereof. The inner cutter 19 which projects a substantial distance beyond the periphery of the traction wheel 15 will cut into the ground at the edge of the walk and as the wheel 15 and the cutter 19 rotate in a clockwise direction, the outer cutter 23 will be rotated in a counterclockwise direction through the medium of the gear train formed by the gears 27, 29 and 30.

By providing the cutting blades 21 and 25 with convex opposite keen edges, the blades of grass and roots or the like which will be engaged by this trimmer will be quickly and cleanly cut without causing the blades to push the heavier or thicker diameter material outwardly from between the blades.

I do not mean to confine myself to the exact details of construction herein disclosed, but claim all variations falling within the purview of the appended claim.

What I claim is:

A lawn edge trimmer comprising a traction wheel, a forked handle, a shaft for said wheel fixed to said handle between the arms of the fork thereof, a cutter fixed to said wheel and projecting therefrom, a sun gear fixed relative to said wheel and said cutter, a hub carried by said sun gear, a second cutter disposed in face abutting relation to said first cutter and rotatably engaging about said hub, a ring gear fixed to said second cutter, and an intermediate gear rotatably carried by one arm of the fork of said handle and meshing with said sun and ring gears to thereby rotate said second cutter reversely from said first cutter.

LOUIS P. BECKER.

REFERENCES CITED

The following references are of record in the file of this patent:

UNITED STATES PATENTS

| Number | Name | Date |
|---|---|---|
| 1,472,587 | Crowder | Oct. 30, 1923 |

FOREIGN PATENTS

| Number | Country | Date |
|---|---|---|
| 15,379 | Great Britain | 1908 |
| 15,058 | Australia | 1928 |